US008913504B2

(12) United States Patent
Olgaard et al.

(10) Patent No.: US 8,913,504 B2
(45) Date of Patent: Dec. 16, 2014

(54) SYSTEM AND METHOD FOR INITIATING TESTING OF MULTIPLE COMMUNICATION DEVICES

(75) Inventors: Christian Volf Olgaard, Saratoga, CA (US); Ruizu Wang, San Ramon, CA (US)

(73) Assignee: Litepoint Corporation, Sunnyvale, CA (US)

( * ) Notice: Subject to any disclaimer, the term of this patent is extended or adjusted under 35 U.S.C. 154(b) by 0 days.

(21) Appl. No.: 13/462,459

(22) Filed: May 2, 2012

(65) Prior Publication Data
US 2013/0294252 A1  Nov. 7, 2013

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl.
USPC ........... 370/241; 370/242; 370/243; 370/244; 370/245; 455/67.11

(58) Field of Classification Search
CPC ............................. H04W 24/00–24/10; H04W 56/0005–56/0015; H04B 17/00–17/029
USPC ......... 370/241, 242–245, 250–253, 319, 324, 370/503, 507, 509–515; 455/67.11–67.7, 455/423–425; 714/742
See application file for complete search history.

(56) References Cited

U.S. PATENT DOCUMENTS

| 8,000,656 B1* | 8/2011 | Jiao et al. ................... 455/67.11 |
| 2004/0006728 A1 | 1/2004 | Scholten |
| 2006/0085157 A1 | 4/2006 | Giral et al. |
| 2011/0057663 A1 | 3/2011 | Iwamoto et al. |
| 2011/0069624 A1* | 3/2011 | Olgaard ........................ 370/252 |
| 2011/0090799 A1 | 4/2011 | El-Hassan et al. |
| 2011/0145645 A1 | 6/2011 | Volkerink et al. |
| 2011/0205080 A1* | 8/2011 | Millot et al. ............... 340/854.4 |

OTHER PUBLICATIONS

International Search Report Dated Jun. 27, 2013 for Application No. PCT/US2013/028557; 3 Pages.
Written Opinion Dated Jun. 27, 2013 for Application No. PCT/US2013/028557; 6 Pages.

* cited by examiner

*Primary Examiner* — Awet Haile
*Assistant Examiner* — Eric Myers
(74) *Attorney, Agent, or Firm* — Vedder Price PC

(57) ABSTRACT

A system and method for initiating testing of a plurality of communication devices. The tester and devices under test (DUTs) are first synchronized as a way of confirming test readiness on the part of the DUTs, Following that, a test sequence is initiated by the tester. The synchronization and test initiation can be accomplished using signals with differing signal magnitudes or device identifiers. The test sequence can be a DUT transmit signal test in which each DUT transmits data packets in accordance with one or more predefined test sequences. Alternatively, the test sequence can be a DUT receive signal test in which the tester transmits data packets to the DUTs with differing signal frequencies or signal magnitudes.

11 Claims, 4 Drawing Sheets

SYSTEM AND METHOD FOR INITIATING TESTING OF MULTIPLE COMMUNICATION DEVICES

TECHNICAL FIELD

The present invention relates generally to systems and methods for testing electronic equipment. More particularly, it relates to improvements in systems and methods for testing wireless signal transceivers using test platforms consisting of hardware, firmware and/or software components.

BACKGROUND

Many of today's handheld devices make use of wireless "connections" for telephony, digital data transfer, geographical positioning, and the like. Despite differences in frequency spectra, modulation methods, and spectral power densities, the wireless connectivity standards use synchronized data packets to transmit and receive data. In general, all of these wireless capabilities are defined by industry-approved standards (e.g. IEEE 802.11 and 3GPP LTE) which specify the parameters and limits to which devices having those capabilities must adhere.

At any point along the device-development continuum, it may be necessary to test and verify that a device is operating within its standards' specifications. Most such devices are transceivers, that is, they transmit and receive wireless RF signals. Specialized systems designed for testing such devices typically contain subsystems designed to receive and analyze device-transmitted signals (e.g., vector signal analyzers, or VSAs) and to send signals (e.g., vector signal generators, or VSGs) that subscribe to the industry-approved standards so as to determine whether a device is receiving and processing the wireless signals in accordance with its standard.

Conventional approaches have included a system and method for testing multiple devices simultaneously using a single tester. This can reduce the overall test-time per device because multiple devices are tested in the same time period.

Other conventional approaches have included a system and method for testing a device containing a predefined test sequence which enables the device and tester to execute such predefined test sequence while engaging in minimal non-test control interactions. This can reduce the overall test-time per device because it reduces the amount of time involved in non-test control communications.

However, such approaches have not been capable of simultaneous testing of devices with predefined test sequences, due to differences in synchronization timing of the individual devices and the challenge this poses on coordinated execution of predefined test sequences.

SUMMARY

A system and method are provided for initiating testing of a plurality of communication devices. The tester and devices under test (DUTs) are first synchronized as a way of confirming test readiness on the part of the DUTs, Following that, a test sequence is initiated by the tester. The synchronization and test initiation can be accomplished using signals with differing signal magnitudes or device identifiers. The test sequence can be a DUT transmit signal test in which each DUT transmits data packets in accordance with one or more predefined test sequences. Alternatively, the test sequence can be a DUT receive signal test in which the tester transmits data packets to the DUTs with differing signal frequencies or signal magnitudes.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry. Thus, for example, one or more of the functional blocks (e.g., processors, memories, etc.) may be implemented in a single piece of hardware (e.g., a general purpose signal processor, random access memory, hard disk drive, etc.). Similarly, any programs described may be standalone programs, may be incorporated as subroutines in an operating system, may be functions in an installed software package, etc.

Efforts to reduce test times on a per-DUT basis involve testing two or more DUTs together, i.e., with contemporaneous connections to the testing hardware, as well as simultaneous, or at least substantially simultaneous, testing in terms of signals provided to and signals received from each DUT. As a result, even with increases in testing time for each DUT, the per-DUT test time is still reduced since multiple DUTs are being tested during such otherwise increased testing time. (For purposes of the examples discussed below, the testing environment includes four DUTs. However, it will be readily understood that the principles and techniques discussed can apply to the testing of two or more DUTs, with four merely being one example.)

Figures 1, 4:
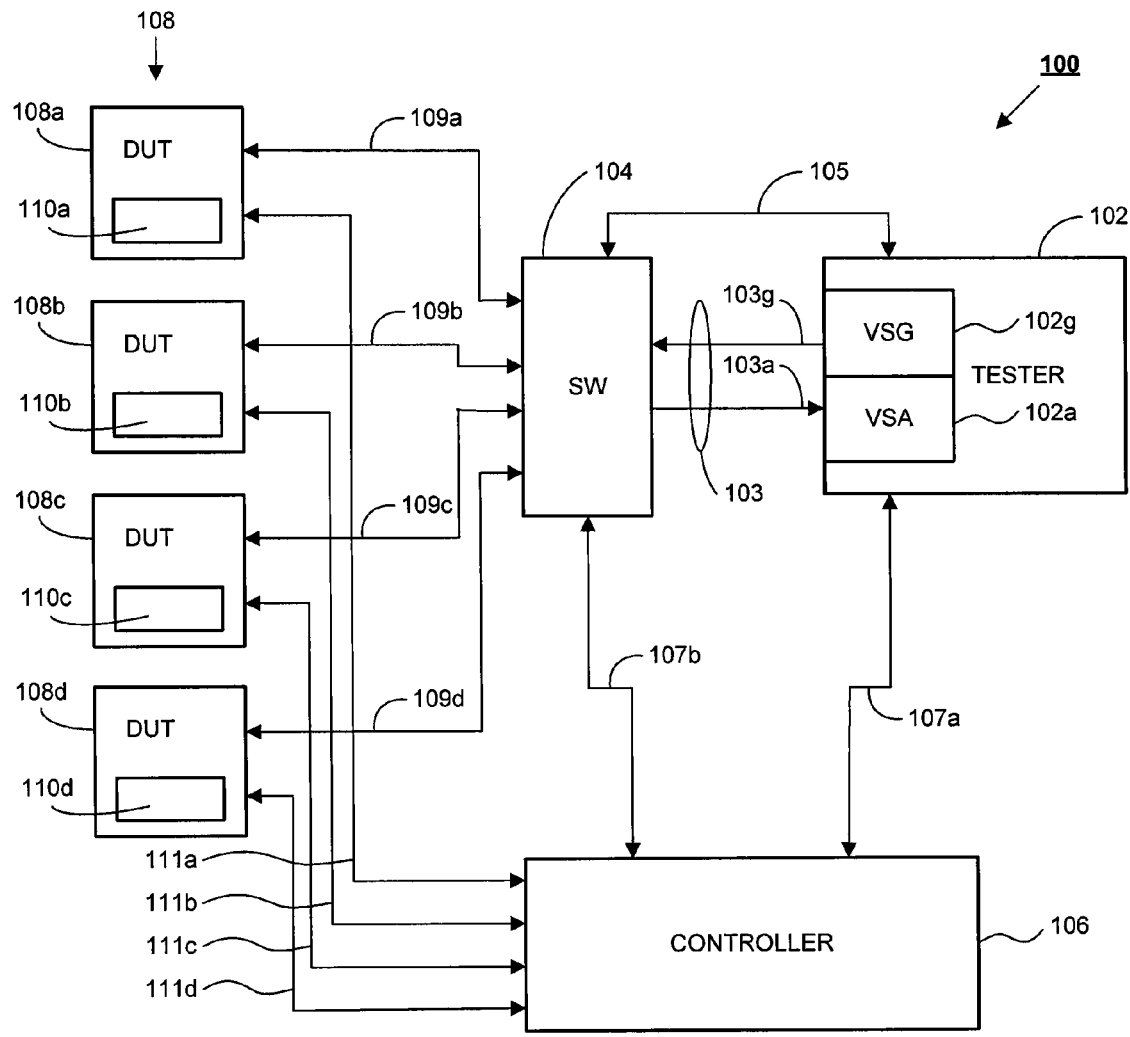
FIG. 1 is a functional block diagram of a testing environment for testing multiple communication devices in accordance with one embodiment of the presently claimed invention.
FIG. 4 illustrates possible relationships between power levels and media access control (MAC) addresses for the exemplary testing methods of FIGS. 2 and 3.

Referring to FIG. 1, a testing environment 100 for testing in accordance with various embodiments of the presently claimed invention includes test equipment in the form of a tester 102, a signal distribution device 104, such as a switch (or multiple switches or signal attenuators controlled to work together as is well understood in the art), and multiple DUTs 108a-d. The tester 102 typically includes at least one vector signal generator (VSG) 102g and at least one vector signal analyzer (VSA) 102a. Additionally, the switch 104 can be external to or included as part of the tester 102. Also included is a controller 106, e.g., a personal computer (PC). The controller communicates with the tester 102 and may also communicate with the switch 104 and DUTs 108 (as discussed in more detail below) via respective communication paths 107a, 107b, 111a-d, through which control signals are provided to and data are received from the tester 102, switch 104 and DUTs 108. An alternative or additional communication path 105 can be included between the tester 102 and switch 104 for conveyance of control signals from the tester 102 to the switch 104.

Following initialization of the DUTs 108, the tester 102 transmits a test packet from the VSG 102g via a communication path 103g to the switch 104 and respective communication paths 109a-d to the DUTs 108. As will be readily appreciated, the test packet from the VSG 102g is replicated by the switch 104 for simultaneous transmission to each DUT 108. This allows for a receive (RX) test of the receiver within each DUT 108. The controller 106, via its control communication paths 111, provides appropriate control signals for initializing the DUTs 108 and setting up for performing the desired received test.

Conversely, a DUT transmit (TX) test can be performed also by having the DUTs 108 transmit signals, via communication paths 109 to the switch 104, which in accordance with its control signals 105, 107b, selectively conveys, e.g., multiplexes, the respective signals as a transmit signal 103a to the VSA 102a within the tester 102. Such a transmit test typically involves transmission by the DUTs 108 of data packets of specified frequencies and power levels. By initializing the DUTs 108 simultaneously and having them transmit their respective data packets simultaneously, the settling time for the DUTs 108 is substantially the same. However, the overall test time including initialization is shorter than if the same number of DUTs 108 were initialized and tested sequentially, thereby increasing test efficiency. As before, the controller 106 provides control signals 111 for initializing the DUTs 108 and defining the transmit frequencies and power levels.

Alternatively, the communications 111 between the controller 106 and DUTs 108 can be eliminated, or at least significantly reduced, if each DUT 108 includes a respective predefined test sequence 110a-d stored within the DUT 108. Based on the stored predefined test sequence 110, following synchronization of the DUTs 108 and tester 102 (e.g., by having the tester 102 transmit a synchronization initiation signal from its VSG 102g, to which each DUT 108 responds with a synchronization confirmation signal), the tester 102 and DUTs 108 can execute the predefined test sequences 110. Such predefined test sequences can include sending a series of data packets at specific frequencies and/or power levels from the tester 102 to each DUT 108, or from each DUT 108 to the tester 102. With the test sequence predefined and stored, minimal, if any, interaction between the controller 106 and DUTs 108 is needed, thereby reducing the number of non-test control communications and increasing test efficiency correspondingly.

Where the transmission is from the tester 102 to the DUT 108 (e.g., RX testing) having a predefined test sequence with a pre-negotiated number of data packets ensures that the DUT 108 will "know" when the test is completed. The tester 102 will continue transmitting data packets until the DUT 108 has received that predetermined number of data packets. Alternatively, the DUT 108 could receive data packets for a predefined time interval.

However, the synchronization time needed for each DUT 108 is likely to be different, and in some instances, can be sufficiently different to present a timing problem. For example, in the event that one DUT 108a achieves synchronization before the others, and begin sending its predefined TX testing sequence, the synchronizing exchange between the tester 102 and other DUTs 108b-d could be disrupted. Similarly, in a RX test sequence, if one DUT 108a is synchronized and ready to receive test packets before the other DUTs 108b-d, then it may disrupt coordinated reception of simultaneous data packets being sent by the tester 102. Accordingly, when testing multiple DUTs 108 in which predefined test sequences 110 are used (e.g., stored within each DUT 108), it is important to ensure that all DUTs 108 are synchronized and ready before beginning execution of the predefined test sequence 110. If not, some DUTs 108 could receive data packets before they are ready (e.g., for demodulation, processing, etc.), resulting in an incorrect packet error rate (PER) measurement.

Figure 2:
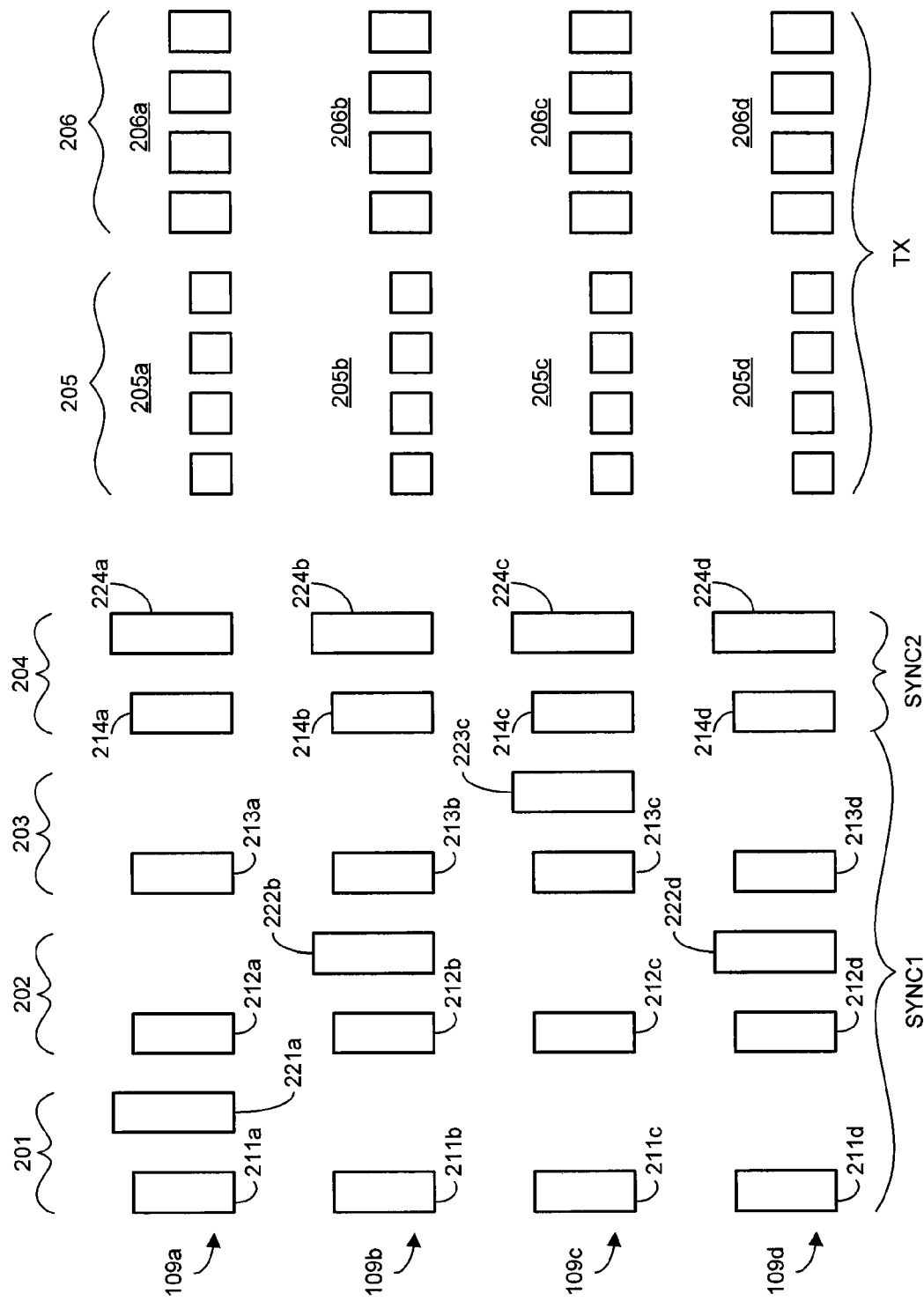
FIG. 2 illustrates signal timing relationships for a method of testing multiple communication devices in accordance with one embodiment of the presently claimed invention.

Referring to FIG. 2, in accordance with an exemplary embodiment of the presently claimed invention, all DUTs 108 (FIG. 1) are synchronized before beginning execution of predefined TX test sequences 110 in which the DUTs 108 essentially begin sending simultaneously predefined series of packet data signals to the switch 104, which, in turn enables the tester 102 to receive data packets identified with each DUT 108. This synchronized testing is established in two parts: first it is ensured that synchronization of all DUTs 108 has been initiated, and, second, the test sequences 110 are then initiated.

Referring to FIG. 2, in accordance with one embodiment of the presently claimed invention, the tester 102 sends data packets 211 substantially simultaneously to the DUTs 108 during synchronization interval 201. In this example, the first DUT 108a sends back, in return, a synchronization confirmation packet 221a indicating its readiness (e.g., synchronization). However, the remaining DUTs 108b, 108c, 108d do not return corresponding confirmation packets (e.g., due to failure to receive their synchronization packets 211b, 211c, 211d). During the next interval 202, the tester 102 again sends synchronization packets 212 to the DUTs 108. This time, the second 108b and fourth 108d DUTs return synch confirmation packets 222a, 222d to indicate their readiness. In the next interval 203, synchronization packets 213 are sent again and now the third DUT 108c confirms its readiness by a return confirmation packet 223c.

Now that all DUTs 108 have confirmed synchronization, the tester 102 sends test initiation messages during interval 204 in the form of a second set of synchronization packets 214 having a different media access control (MAC) address, and all four DUTs 108 confirm synchronization by returning confirmation packets 224. During this interval 204, as noted, a different MAC address is used and the power level of the synchronizing data packets 214 is set sufficiently high to ensure that the packets 214 will always be received by the DUTs 108. After this second synchronization confirmation during interval 204, the tester 102 and DUTs 108 begin execution of a predefined TX test, in which the DUTs 108 each send a series of data packets 205 of similar (e.g. substantially identical) frequency and/or power level. The four sets of data packets 205a-d are depicted as being mutually offset in time to reflect the fact that perfect time synchronization may not be possible. The switch 104 (FIG. 1) selects one packet from each DUT 108 before the sequence moves on to the next set of DUT TX data packets 206. As before, four sets of four data packets are transmitted. The predefined test sequences 110 would continue to send sets of TX data packets of specific frequency and power level in accordance with the standard-prescribed test criteria for testing the TX physical layer performances of the DUTs 108. (As will be readily understood, additional packets required to allow settling by the DUT transmitters are not shown but can be used. Further, the capture of the data packets 205, 206 is longer than the capture of one individual data packet but the time required for all DUTs to be synchronized and ready for testing, e.g., with transmitters properly settled, is shared and, therefore, provides an overall improvement in test efficiency.

Figure 3:
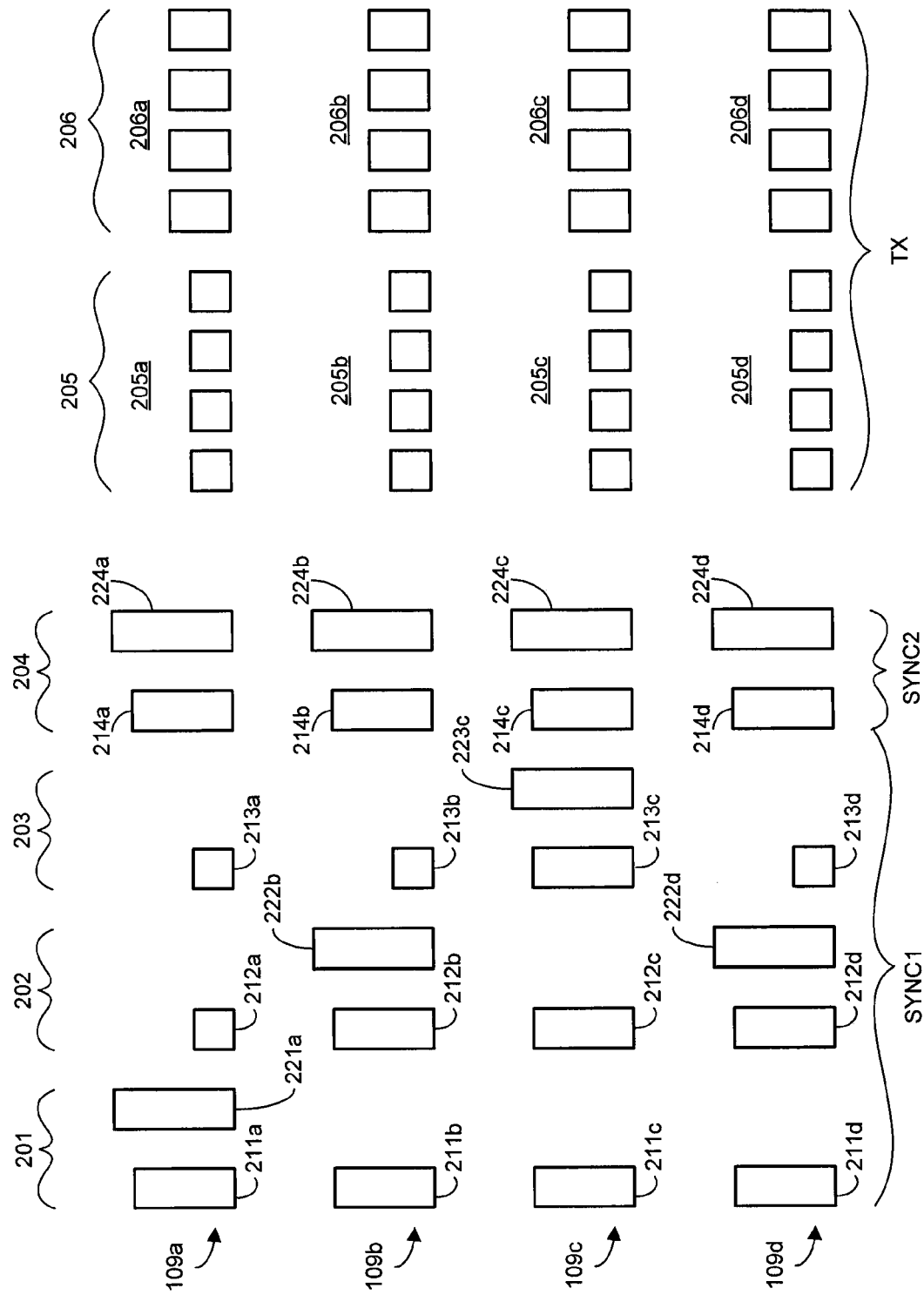
FIG. 3 illustrates signal timing relationships for a method of testing multiple communication devices in accordance with another embodiment of the presently claimed invention.

Referring to FIG. 3, in accordance with another exemplary embodiment, all DUTs 108 are synchronized before executing a predefined test sequence in which the DUTs 108 substantially simultaneously begin sending predefined series of signals to the switch 104, which, in turn, enables the tester 102 to receive data packets identified with each DUT 108. As in the previous example, during the initial synchronization intervals 201, 202, 203, the tester 102 transmits synchronization packets 211, 212, 213, to which the various respective DUTs 108 reply with confirmation packets 221, 222, 223. However, in this example, following receipt of a confirmation packet from a DUT 108, the tester 102, while still transmitting a synchronization packet to that same DUT 108, does so at a reduced power level. For example, during the first interval 201, the first DUT 110a responded to its synchronization packet 211a with a confirmation packet 221a. Accordingly, during the next interval 202, the synchronization packet 212a sent by the tester 102 for reception by the first DUT 110a is reduced in power to a level where the DUT 110a will not receive and recognize such packet 212a. Meanwhile, the packets 212b, 212c, 212d transmitted for reception by the previously unresponsive DUTs 110b, 110c, 110d, are transmitted at the original higher power level. Again, as before, following receipt of confirmation packets 222a, 222d from the second 110b and fourth 110d DUTs, the confirmation packets 213b, 213d transmitted by the tester 102 in the next interval 203 are reduced in power.

Following receipt of confirmation packets 211a, 222a, 222d, 223c from all four DUTs 108a-d, the tester 102 transmits test initiation messages during interval 204 in the form of further synchronization packets 214a-d at a power level sufficient to ensure that such packets 214 will be received and recognized by the DUTs 108. In this example, however, the MAC address remains the same for this set of synchronization packets 214. Since earlier repeated confirmation packets 212a, 213a, 213b, 213d had been sent at reduced power levels, potential confusion with such previous synchronization packets and the subsequent test initiation packets 214 during the test initiation interval 204 can be avoided. In other words, the test initiation packets 214 will be recognized for what they are, i.e., to initiate testing since synchronization has been established. Following this, in accordance with the predefined test sequences 110, transmit data packet sequences 205, 206 are transmitted by the DUTs 108 for reception and analysis by the tester 102.

Referring to FIG. 4, it should be recognized that the techniques of varying MAC addresses and/or synchronization packet power levels can be combined. For example, in the example of FIG. 2, the power levels remain the same while the MAC addresses were different (left diagram of FIG. 4). In the example of FIG. 3, the power levels were varied while the MAC address remained the same (center diagram of FIG. 4). However, in accordance with the presently claimed invention, power and MAC address can both be varied, as desired (right diagram of FIG. 4).

Further, from the foregoing discussion it should be recognized that control over the testing is initiated and supervised by the tester 102 and/or controller 106. The individual DUTs 108 need only be preprogrammed to respond to the synchronization and test initiation messages by transmitting predetermined sequences of synchronization and test confirmation messages, respectively, followed by transmitting sequences of test data packets having predetermined data packet signal characteristics (e.g., signal frequency, signal magnitude, bit rate, modulation type, etc.).

Figure 5:
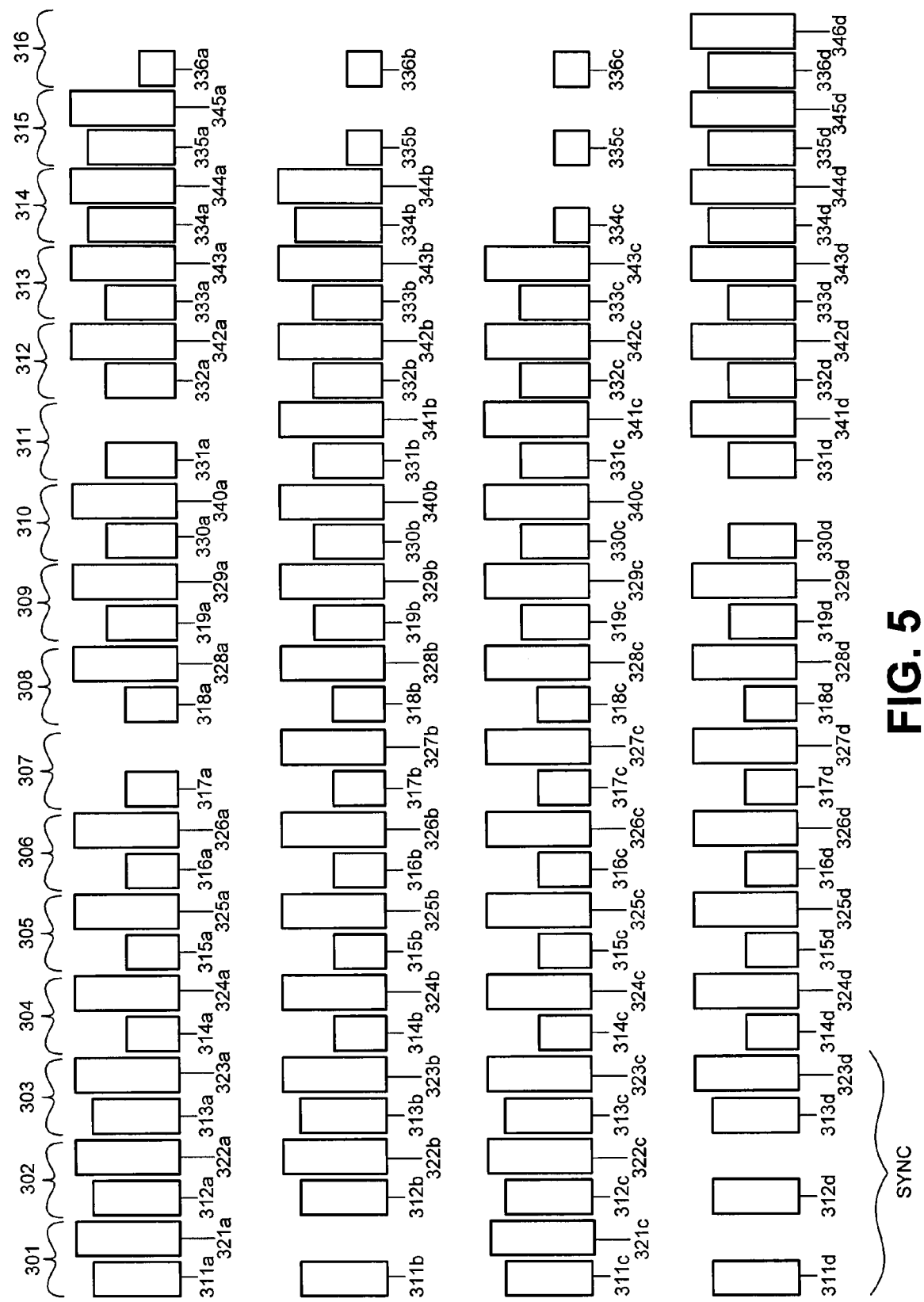
FIG. 5 illustrates signal timing relationships for a method of testing multiple communication devices in accordance with another embodiment of the presently claimed invention.

Referring to FIG. 5, in accordance with another exemplary embodiment, the tester 102 ensures that all DUTs 108 are ready to receive a RX test sequence of data packets in accordance with the predefined test sequences 110 by sending synchronization packets 311, 312, 313 during respective time intervals 301, 302, 303 until all DUTs 108 have identified their readiness with confirmation packets 321a, 321c, 322a, 322b, 322c, 323a, 323b, 323c, 323d. Following reception of these confirmation packets 321, 322, 323, the tester 102 begins transmitting a predetermined number of RX test packets 314, 315, 316, 317, 318 at predefined frequencies and power levels during subsequent intervals 304, 305, 306, 307, 308. In accordance with well known principles, the packet error rate (PER) can be calculated based on this transmitted set of data packets 314, 315, 316, 317, 318. After the tester 102 has transmitted each test packet, the DUTs 108 will, if having received such test packet, send corresponding acknowledgement packets 324, 325, 326, 327, 328. The tester 102 and DUTs 108 (in accordance with their predetermined test sequences 110) keep track of the number of acknowledgement packets 324, 325, 326, 327, 328 sent, while the tester 102 sends a predetermined number of packets for the frequency and power level ranges specified in the pertinent wireless signal standard.

Once the tester 102 has sent the predetermined number of test packets, it begins sending a different sequence of test packets 319, 330, 331, 332, 333 having one or more different frequencies and/or signal power levels. As before, the tester 102 and DUTs 108 keep track of the number of acknowledgement packets 329, 340, 341, 342, 343 transmitted in response by the DUTs 108. Following this, the tester 102 will send another predetermined number of test packets 334, 335, 336 at one or more different power levels and/or using one or more different modulation types.

When these sequences of all predetermined numbers of data packets have been transmitted by the tester 102, the tester 102 will initiate a "catch up" sequence during subsequent intervals 314, 315, 316, during which some number of data packets at specific power levels are sent to specific DUTs 108 who have not yet acknowledged receipt of the earlier predetermined number of data packets. The tester 102 keeps track of these additional packets 334, 335, 336 sent to each DUT 108 to determine the packet error rates of each DUT 108.

Based on the foregoing, it should be appreciated that providing a second synchronization event to initiate testing before execution of the predefined sequences 110 of TX data packets, and having some number of data packets sent in advance of execution of the predefined sequence of RX data packets until all DUTs 108 have confirmed synchronization (or some other form of readiness) ensures that multiple DUTs 108 can be tested using stored predefined test sequences 110, despite differences in the relative timing of synchronization data packet responses.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of initiating synchronized testing of a plurality of communication devices, comprising:
   transmitting, with a tester, a plurality of synchronization initiation messages having a first plurality of signal characteristics;
   listening, with said tester, for one or more synchronization confirmation messages;
   when said tester fails to receive, from said plurality of communication devices, a corresponding plurality of synchronization confirmation messages corresponding to said plurality of synchronization initiation messages, then
   transmitting again, with said tester, said plurality of synchronization initiation messages,
   listening again, with said tester, for one or more synchronization confirmation messages, and
   repeating said transmitting again and said listening again until said tester has received said plurality of synchronization confirmation messages corresponding to said plurality of synchronization initiation messages;
   following reception by said tester of said corresponding plurality of synchronization confirmation messages, transmitting, with said tester, a corresponding plurality of test initiation messages having a second plurality of signal characteristics; and
   listening, with said tester, for one or more test confirmation messages;
   wherein
   said first plurality of signal characteristics includes a first plurality of signal magnitudes and a first unique device identifier associated with said tester,
   said second plurality of signal characteristics includes a second plurality of signal magnitudes and a second unique device identifier associated with said tester, and
   one or more of said second plurality of signal characteristics during said transmitting of said plurality of test initiation messages are purposely different from a corresponding one or more of said first plurality of signal characteristics during said transmitting of said plurality of synchronization initiation messages.

2. The method of claim 1, wherein said one or more unique device identifiers comprise first and second media access control (MAC) addresses.

3. The method of claim 1, further comprising receiving, with said tester, a plurality of data packets in accordance with one or more predefined test sequences.

4. The method of claim 1, further comprising transmitting, with said tester, a plurality of data packets, wherein:
   a first portion of said plurality of data packets has a first plurality of data packet signal characteristics including a first data packet signal frequency and a first data packet signal magnitude;
   a second portion of said plurality of data packets has a second plurality of data packet signal characteristics including a second data packet signal frequency and a second data packet signal magnitude; and
   at least one of said second plurality of data packet signal characteristics is different from a corresponding one of said first plurality of data packet signal characteristics.

5. The method of claim 1, following reception by said tester of a synchronization confirmation message from one of said plurality of communication devices and prior to said transmitting, with said tester, said plurality of test initiation messages, further comprising transmitting, with said tester, one or more subsequent ones of said plurality of synchronization initiation messages such that said one or more subsequent ones of said plurality of synchronization initiation messages cannot be recognized by said one of said plurality of communication devices.

6. The method of claim 5, wherein said transmitting, with said tester, one or more subsequent ones of said plurality of synchronization initiation messages such that said one or more subsequent ones of said plurality of synchronization initiation messages cannot be recognized by said one of said plurality of communication devices comprises transmitting said one or more subsequent ones of said plurality of synchronization initiation messages with a reduced signal magnitude.

7. A method of initiating synchronized testing of a plurality of communication devices, comprising:
   listening, with a plurality of devices under test (DUTs), for a corresponding plurality of synchronization initiation messages from a signal source and having a first plurality of signal characteristics;
   transmitting, with each one of said plurality of DUTs that received one of said plurality of synchronization initiation messages, a respective one of a plurality of synchronization confirmation messages corresponding to said one of said plurality of synchronization initiation messages;
   when one or more of said plurality of DUTs fails to receive one of said plurality of synchronization initiation messages, then listening again, with at least each one of said one or more of said plurality of DUTs, for at least a portion of said plurality of synchronization initiation messages from said signal source;
   following reception, by each one of said one or more of said plurality of DUTs, of at least one of said at least a portion of said plurality of synchronization initiation messages from said signal source, transmitting, with each one of said one or more of said plurality of DUTs, a respective one of at least a portion of said plurality of synchronization confirmation messages corresponding to said at least a portion of said plurality of synchronization initiation messages;
   listening, with said plurality of DUTs, for a corresponding plurality of test initiation messages from said signal source and having a second plurality of signal characteristics; and transmitting, with each one of said plurality of DUTs that received one of said plurality of test initiation messages, a respective one of a corresponding plurality of test confirmation messages;
wherein
said first plurality of signal characteristics includes a first plurality of signal magnitudes and a first unique device identifier associated with said signal source,
said second plurality of signal characteristics includes a second plurality of signal magnitudes and a second unique device identifier associated with said signal source, and
one or more of said second plurality of signal characteristics during said transmitting of said plurality of test initiation messages are purposely different from a corresponding one or more of said first plurality of signal characteristics during said transmitting of said plurality of synchronization initiation messages.

8. The method of claim 7, wherein said one or more unique device identifiers comprise first and second media access control (MAC) addresses.

9. The method of claim 7, further comprising transmitting, with said plurality of DUTs, a plurality of data packets in accordance with one or more predefined test sequences.

10. The method of claim 7, further comprising transmitting, with said tester, a plurality of data packets, wherein:
a first portion of said plurality of data packets has a first plurality of data packet signal characteristics including a first data packet signal frequency and a first data packet signal magnitude;
a second portion of said plurality of data packets has a second plurality of data packet signal characteristics including a second data packet signal frequency and a second data packet signal magnitude; and
at least one of said second plurality of data packet signal characteristics is different from a corresponding one of said first plurality of data packet signal characteristics.

11. The method of claim 7, following said transmitting, with one of said plurality of DUTs, a respective one of said plurality of synchronization confirmation messages and prior to reception, with said one of said plurality of DUTs, of one of said plurality of test initiation messages, further comprising failing, with said one of said plurality of DUTs, to receive another one of said plurality of synchronization initiation messages.

* * * * *